Nov. 1, 1960 F. M. BRAUER 2,958,768
ELECTRONIC SERVO SYSTEM FOR FREQUENCY CONTROL
Filed Nov. 3, 1958
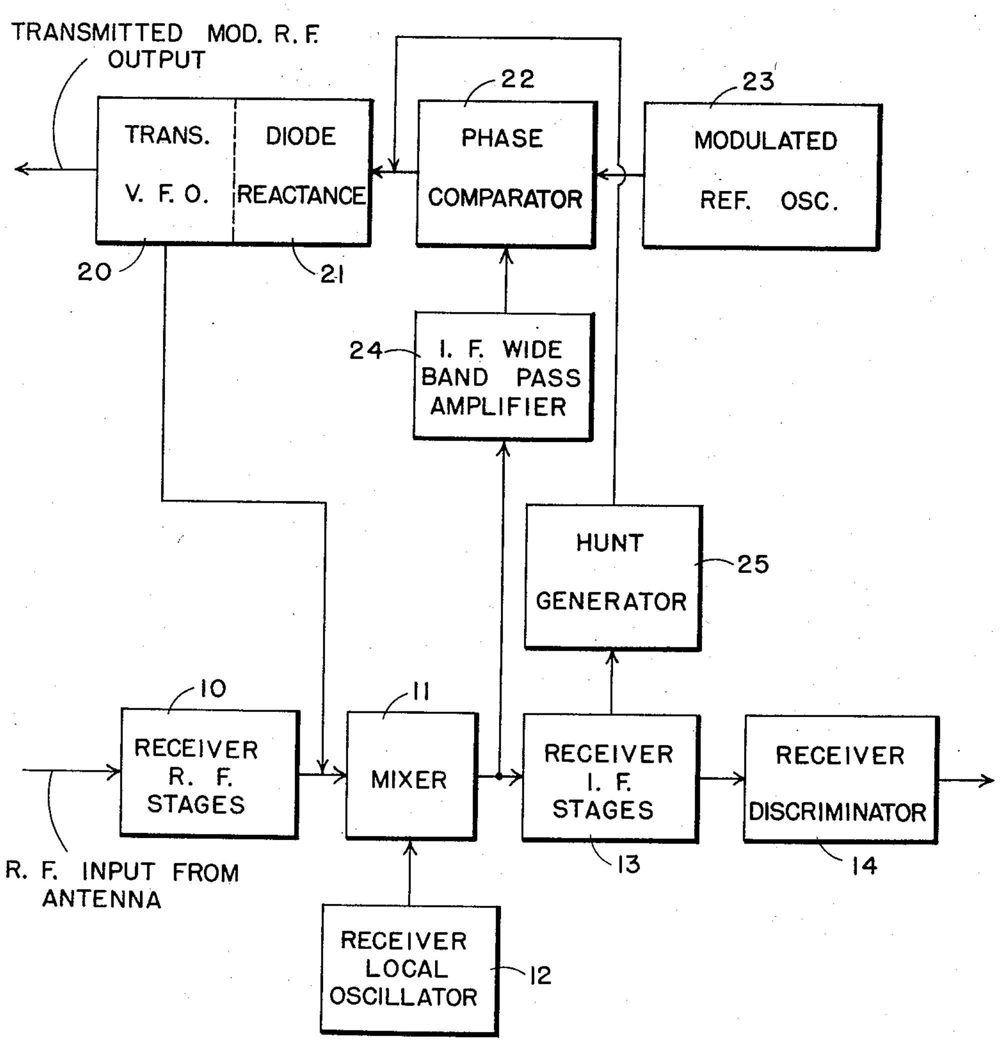
INVENTOR.
FRANK M. BRAUER.
BY Alden D. Redfield
Irwin F. Garfinkle
ATTORNEYS.

United States Patent Office
2,958,768
Patented Nov. 1, 1960

2,958,768

ELECTRONIC SERVO SYSTEM FOR FREQUENCY CONTROL

Frank M. Brauer, Cincinnati, Ohio, assignor to Avco Manufacturing Corporation, Cincinnati, Ohio, a corporation of Delaware Filed Nov. 3, 1958, Ser. No. 771,363

10 Claims. (Cl. 250—13)

This invention relates to a system for generating controlled frequencies and, more particularly, to a receiver-transmitter system arranged for transmission at the receiver frequency of essentially spurious-free, frequency modulated signals.

The rapid advances and the techniques of the military and of industry have created an urgent need for more channels of reliable communications. The frequency spectrum cannot be enlarged; therefore, to obtain additional channels of communication it is necessary to decrease the channel spacing. To accomplish this, the frequency control system of a receiver-transmitter must have great stability, and spurious responses must be substantially decreased or avoided.

The prior art teaches many systems which achieve high degrees of frequency stability in receiver transmitter equipment. These include: (1) The use of a discrete quartz crystal for each channel and Armstrong type modulation; (2) The use of stable variable frequency oscillators; (3) The use of a variable frequency oscillator stabilized by a slow-acting frequency discriminator driven by the receiver intermediate frequency, modulation being achieved by means of a reactance control circuit in the oscillator; (4) By means of a simple sidestep of the previously derived signals of the receiver local oscillator frequency, modulation being accomplished by means of the sidestep oscillator.

While the foregoing and other prior art systems are capable of achieving ample frequency stability, none is capable of eliminating sufficient spurious responses in the transmitter output. So long as the spurious frequencies are not considerably reduced, it is not practicable to reduce channel spacing.

One of the simplest means for receiving and transmitting at the same frequency is to use a stable frequency side-step oscillator at the receiver intermediate frequency in conjunction with the receiver local oscillator. However, the spurious frequency responses produced by such an arrangement renders the system impractical where it is desired to employ minimum channel spacings. The same unsolved problem is raised in all other known receiver-transmitter systems.

An object of this invention is to provide a receiver-transmitter system in which is derived for transmission an essentially spurious-free, frequency modulated signal side-stepped by an appropriate number of kilocycles per second from the local oscillator frequency of the receiver.

Another object of this invention is to control the output frequency of a variable frequency oscillator, and to reduce spurious signal responses to a minimum.

Another object of this invention is to provide a variable frequency receiver-transmitter combination in which reception and transmission are accomplished at the same frequencies with minimum spurious responses and in which modulation is accomplished at a single fixed frequency.

For a more complete understanding of the nature and further objects of this invention, reference should now be made to the following detailed description and to the accompanying drawing in which the single figure illustrates in block diagram form a preferred embodiment of the invention.

Generally, the invention concerns a VHF receiver-transmitter communications equipment designed to transmit and receive at the same frequency. For this purpose, the output signal from the transmitter variable frequency oscillator is spaced in frequency from that of the local oscillator of the receiver by an amount to the intermediate frequency, and both the receiver and transmitter have a common mixer.

Briefly, a sampling of the variable frequency oscillator signal of the transmitter (the signal to be controlled) is injected into the common mixer and mixed with frequencies from the receiver local oscillator. The receiver local oscillator is provided with crystal stability and is the primary reference of the system. The output from the mixer is amplified and fed into the first of two input circuits of a phase discriminator or comparator. The second input of the phase discriminator is supplied with the output of a secondary reference oscillator which consists of a discriminator stabilized, frequency modulated oscillator operating at the receiver intermediate frequency.

If both input signals to the phase discriminator have the same frequency, that is, if the output of the mixer is at the correct intermediate frequency, the phase discriminator produces no output. However, if the inputs to the phase discriminator are not at the same frequency, the phase discriminator output is applied as a correction signal to the variable frequency oscillator resulting in a frequency stability equivalent to that of the primary and secondary reference oscillators.

Ordinarily, the harmonics generated by the mixer cause most of the spurious responses in the transmitted signal. However, since frequency control of the variable frequency oscillator is accomplished by means of the control voltage from the phase discriminator, the spurious responses due to generated harmonics from the mixer are avoided, and over-all spurious responses are greatly attenuated.

Referring now to the drawing, there is illustrated a frequency modulated VHF receiver-transmitter combination designed to transmit and receive at the same frequency. The receiver portion of the combination is essentially conventional, and it includes radio frequency stages 10 and a mixer 11 driven by a local oscillator 12. The output of the mixer 11 is then amplified in conventional intermediate frequency stages 13 and is converted to audio in a discriminator 14.

For a purpose hereinafter to be explained, the local oscillator 12 of the receiver is very stable in frequency and constitutes the primary reference frequency of the system. In effect, it is the system clock, controlling the frequency of transmission and reception. The details of the local oscillator 12 form no part of this invention. However, the oscillator system used and reduced to practice in conjunction with this invention is a crystal reference system described in an article entitled "Mobile Radio System Provides 920 Channels" appearing in Electronics, October 10, 1958, pages 96–99.

The transmitter portion of the system includes a variable frequency oscillator 20 employed for generating selected carrier frequencies having minimum spurious responses. The frequency of variable frequency oscillator 20 is varied within coarse limits by shaft rotation in synchronism with the reference crystals controlling the local oscillator 12. The frequency of oscillator 20 is controlled within fine limits by means of a diode reactance 21, the control voltage for the reactance being supplied by means of a novel servo loop. The diode reactance, per se, is not a part of this invention, and any element may be employed having characteristics such that its reactive impedance varies with applied voltage. Thus, by connecting the reactance device in the tuning circuits of the oscillator 20, controlled variations in generated frequency result from the application of an error or control signal.

The novel servo loop includes a phase comparator 22 having first and second input circuits, the first input circuit being supplied from an oscillator 23, modulated by the signal to be transmitted, and the second input circuit being supplied with the output signal from an intermediate frequency wide bandpass amplifier 24.

The modulated oscillator 23 constitutes a secondary reference and is crystal-tuned to the intermediate frequency of the receiver. Since the oscillator 23, which may be controlled by a crystal discriminator automatic frequency control loop, is fixed-tuned at the intermediate frequency of the receiver, it performs the necessary side-step functions for receiving and transmitting at the same frequency.

Modulation of the transmitter at the reference oscillator 23 has at least one outstanding advantage, namely, that modulation is accomplished at a single fixed frequency, thus assuring constant modulating sensitivity. Also, the modulator circuit parameters are easier to control at the lower frequency.

The particular phase comparator circuitry of this system forms no part of the present invention; however, a suitable phase comparator is fully described in the copending application of Raymond L. Midkiff entitled, "Balanced Phase Sensing Circuitry," filed October 14, 1958, Serial Number 767,122, and assigned to the same assignee as this invention. When the signals applied to both input circuits of the phase comparator 22 are of the same frequency, no output results. However, if the frequency output of the amplifier 24 should vary from the intermediate frequency of the receiver, a direct voltage output is produced at the phase comparator. The output produced will be either positive or negative, depending upon the leading or lagging phase relationship of the signals generated by the reference oscillator 23 and the amplifier 24. This output, when applied to the diode reactance 21, is used to adjust the output of the variable frequency oscillator 20.

The servo loop of the system is completed by means of a low-level sampling connection from the variable frequency oscillator 20 to the mixer 11 for heterodyning the output of oscillator 20 with the output of the local oscillator 12.

Thus, the system comprises a complete servo loop. That is to say, the output from the amplifier 24 results from a heterodyning of a sampling of the variable frequency oscillator 20 with the output of the primary reference or local oscillator 12; and further, the output of the variable frequency oscillator 20 is dependent upon a comparison of the outputs from the secondary reference oscillator 23 and the amplifier 24.

A further system refinement includes a hunt generator 25 which scans the variable frequency oscillator 20 within the holding range of the phase discriminator. Broadly, the hunt generator comprises a multivibrator circuit operating into the diode reactance 21. The saw-tooth wave applied to the diode reactance causes both a positive and negative deviation equal to the maximum error anticipated in an "on-channel" condition. The hunt generator 25 could be permitted to run continually, but this would cause modulation of the variable frequency oscillator 20 at the hunt frequency. This is prevented by biasing off the hunt generator with a rectified signal derived from the receiver intermediate frequency stage 13, when the correct intermediate frequency is achieved.

Operationally, the receive and transmit functions are accomplished on the same antenna by means of a co-axial relay (not shown). Also, the transmitter frequency input or sampling to the mixer is maintained below a predetermined level to prevent spurious frequencies within the servo control loop itself. In the system as reduced to practice, and with a transmitter output power of 30 watts fed into 50 ohms at the antenna, the attenuation required of the relay to provide the proper mixer input level was greater than 80 db. Such attenuation is not practical in the co-axial relay, and in order to overcome this difficulty, sampling signals from the variable frequency oscillator are fed into the mixer with the B+ supply removed from the receiver radio frequency amplifier stages. This alleviates the co-axial relay problem, since the attenuation of the receiver radio frequency amplifier with the B+ disabled is more than adequate.

While it is understood that the described system has general utility, a practical application was reduced to practice in connection with a transistorized frequency reference and control system for a 920 channel vehicular VHF—FM receiver-transmitter designed for military use. The particular receiver-transmitter generated a range of 30–76 megacycles with 50 kc. channel spacing and operated from the 24-volt primary of a vehicle. The receiver had a sensitivity of .3 microvolts for a 10 db signal plus noise-to-noise ratio, and the spurious responses were down 85 db. The transmitter generated 30 watts and the transmitted spurious frequencies were also down 85 db. The receiver local oscillator operated at 41.5–64.5 megacycles and was controlled by a crystal reference system. The receiver intermediate frequency and the frequency of the modulated reference oscillator 23 was 11.5 megacycles. Many of the details of this apparatus are disclosed in the aforementioned article appearing in the October 10, 1958, issue of Electronics, and in a paper by Frank Brauer and Don Kammer entitled, "Transistorized Frequency Reference and Control System for 920 Channel Military Vehicular VHF—FM Receiver Transmitter," and published in IRE Transactions on Vehicular Communications in July 1958.

Since it is clear that many modifications, improvements and adaptations may be made to the disclosed receiver-transmitter system, it is to be understood that this invention is not to be limited to the precise arrangement shown, but is to be limited only by the following claims as interpreted in the light of the prior art.

1. In combination, means for generating a stable frequency signal comprising: a signal generator; a control device for controlling the frequency of said signal generator, said control device being responsive to control signals; a stable frequency reference source; a mixer for heterodyning a portion of the output of said signal generator with said stable frequency reference source for generating an intermediate frequency output; a fixed frequency reference source; means for comparing said intermediate frequency output with said fixed frequency reference source for producing a control signal responsive to a frequency difference between said source and said output; and means connecting said control signal to said control device for controlling said signal generator, whereby a signal is generated having a frequency equal to an algebraic summation of the frequencies of said stable frequency reference source and said fixed frequency reference source.

2. The invention as defined in claim 1 and a saw-tooth voltage generator connected to said control device for continuously varying said control device; and means for cutting off said saw-tooth generator when said intermediate frequency output is the same frequency as said fixed frequency reference source.

3. The invention as defined in claim 1 wherein said fixed frequency reference source is modulated.

4. In a receiver-transmitter system, the combination comprising: a receiver having a radio frequency stage tuned to a predetermined frequency, a local oscillator and a mixer for heterodyning the output of said radio frequency stage with said local oscillator for producing an intermediate frequency; a transmitter having a variable frequency oscillator for generating a carrier at said predetermined frequency; a control device for controlling the frequency of said variable frequency oscillator, said control device being responsive to direct voltages; a source of reference frequency fixed-tuned to said intermediate frequency; means during the operation of said receiver-transmitter system as a transmitter for injecting a portion of the output of said variable frequency oscillator into said mixer; means for comparing the frequency output of said mixer with the frequency of said reference source and for producing a direct voltage proportional to any difference in frequency; and means applying said direct voltage to said control device for controlling the frequency of said variable frequency oscillator.

5. The invention as defined in claim 4 wherein said reference source is modulated with signal.

6. The invention as defined in claim 4 and a saw-tooth voltage generator connected to said control device for continuously varying said control device; and means for cutting off said saw-tooth generator when said intermediate frequency output is the same frequency as said fixed frequency reference source.

7. The invention as defined in claim 1, and a voltage generator for generating a voltage which is continuously varying between predetermined limits, said voltage generator being connected to said control device for continuously varying said control device; and means for cutting off said voltage generator when said intermediate frequency output is the same frequency as said fixed frequency reference source.

8. The invention as defined in claim 4, and a voltage generator for generating a voltage which is continuously varying between predetermined limits, said voltage generator being connected to said control device for continuously varying said control device; and means for cutting off said voltage generator when said intermediate frequency output is the same frequency as said fixed frequency reference source.

9. In combination, means for generating a stable frequency signal comprising: a signal generator; a control device for controlling the frequency of said signal generator, said control device being responsive to control signals; a stable frequency reference source; a mixer for heterodyning a portion of the output of said signal generator with said stable frequency reference source for generating an intermediate frequency output; a fixed frequency reference source; a phase comparator for comparing said intermediate frequency output with said fixed frequency reference source for producing a control signal responsive to a frequency difference between said source and said output; means connecting said control signal to said control device for controlling said signal generator, whereby a signal is generated having a frequency equal to an algebraic summation of the frequencies of said stable frequency reference source and said fixed frequency reference source; and a saw-tooth voltage generator connected to said control device for continuously varying said control device; and means for cutting off said saw-tooth generator when said intermediate frequency output is the same frequency as said fixed frequency reference source.

10. In a receiver-transmitter system, the combination comprising: a receiver having a radio frequency stage tuned to a predetermined frequency, a local oscillator and a mixer for heterodyning the output of said radio frequency stage with said local oscillator for producing an intermediate frequency; a transmitter having a variable frequency oscillator for generating a carrier at said predetermined frequency; a control device for controlling the frequency of said variable frequency oscillator, said control device being responsive to direct voltages; a source of reference frequency fixed-tuned to said intermediate frequency; means during the operation of said receiver-transmitter system as a transmitter for injecting a portion of the output of said variable frequency oscillator into said mixer; a phase comparator for comparing the phase of the output of said mixer with the phase of said reference source and for producing a direct voltage proportional to any difference in phase; means applying said direct voltage to said control device for controlling the frequency of said variable frequency oscillator; a sawtooth voltage generator connected to said control device for continuously varying said control device; and means for cutting off said sawtooth generator when said intermediate frequency output is the same frequency as said fixed frequency reference source.

References Cited in the file of this patent

UNITED STATES PATENTS 2,408,826 Vogel ------------------ Oct. 8, 1946

UNITED STATES PATENT OFFICE

CERTIFICATE OF CORRECTION

Patent No. 2,958,768 November 1, 1960

Frank M. Brauer

It is hereby certified that error appears in the printed specification of the above numbered patent requiring correction and that the said Letters Patent should read as corrected below.

Column 2, line 11, for "by an amount to the" read -- by an amount equal to the --.

Signed and sealed this 11th day of April 1961.

(SEAL)
Attest:
ERNEST W. SWIDER

Attesting Officer

ARTHUR W. CROCKER
Acting Commissioner of Patents